Figure 1:
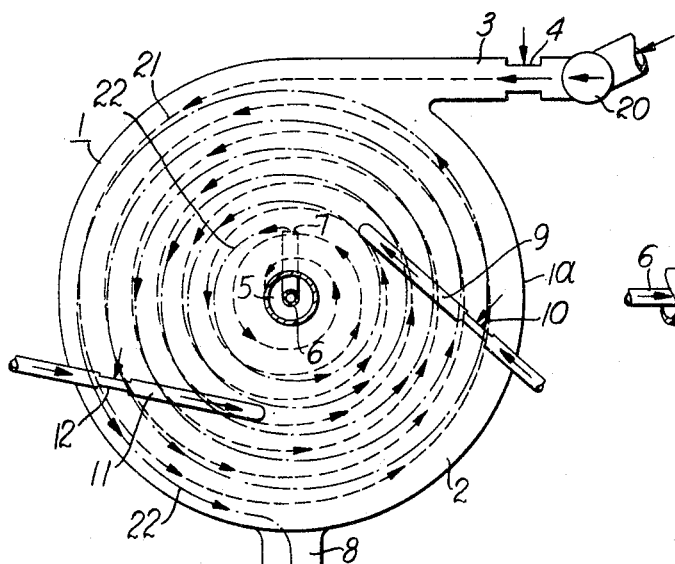

June 9, 1964     O. HEINEMANN     3,136,536

TREATING FINELY DIVIDED MATERIAL IN SUSPENSION

Filed Sept. 28, 1961

Inventor
Otto Heinemann
By Arthur M. Struck
Attorney though still very small compared to present practice and much smaller than heat treating chambers. Also, since the movement of the material is generally in a spiral outward direction counter to the direction of the gas movement and therefore counter to the direction of temperature variation, the advantages of counterflow treatment are obtained.

United States Patent Office 3,136,536
Patented June 9, 1964

1

3,136,536
TREATING FINELY DIVIDED MATERIAL
IN SUSPENSION
Otto Heinemann, Neubeckum, Westphalia, Germany, assignor to Allis-Chalmers Manufacturing Company, Milwaukee, Wis.
Filed Sept. 28, 1961, Ser. No. 141,525
Claims priority, application Germany Aug. 12, 1961
8 Claims. (Cl. 263—21)

This invention relates to treatment of powdery raw material by heating or placing it in contact with processing gas. Specifically, it is a method and apparatus wherein this is accomplished by keeping the raw material in suspension throughout the treating process.

In many applications material to be treated (that is, calcined, roasted, sintered, or otherwise changed by contact with heat or gas such as a reducing or oxidizing gas) has a powdery form. It may, for example, be a recovered part of raw material that was given off as dust during earlier processing or it may be produced from a pulverizing mechanism. Whatever its source it is generally advisable to treat it in this form, if practicable, because there is then no need for any additional processing steps or machinery, and the larger surface to volume ratio of material in a small particle form makes a treating process more efficient.

Prior to the present invention, apparatus and methods utilized in treating powdery material in suspension, usually in heat treating devices, contain various disadvantages. For example, one method heat treats material in suspension and in free fall by passing gas in the opposite direction, that is, from a lower to a higher part of a kiln. Therefore, the material passes through gas having a continually increasing temperature level (that is, in counterflow), and in this respect this application has good heat transfer efficiency. However, it is necessary to keep the velocity of the gas through the chamber very low so that the material is not carried along and exhausted with the gas. As a result of this low velocity, proportionally greater volumes of gas are required to accommodate the material being treated and consequently a very large heat treatment chamber is necessary.

Another prior approach adds the powdery material to a rapidly flowing gas stream. The material then follows the course of the gas and is later separated by means such as a cyclone dust separator. Because of the high velocities the volume of the gases utilized may be small, but because the particles travel in the same direction as the gas the temperature difference between particles and the gas near the particles decreases. This relationship is what is called parallel flow and is generally about fifty percent less efficient than counterflow under equivalent conditions. As a result of this low efficiency it is usually necessary to place a number of such units in series. This, of course, increases the overall size of the apparatus.

Other applications utilize a rotary heating chamber whereby the gas (that the material is to be treated in) is forced to take a spiral or circular path. In this type of application the material and the fuel are introduced at the circumference of the chamber and the material is immediately subjected to heat and carried along with the gas to the vortex at the center and precipitated out. This is, in effect, a parallel flow arrangement and suffers from some of the same disadvantages as the high velocity gas flow method described in the preceding paragraph.

In addition to the disadvantages described, all of these applications encounter a problem in most heat treating processes because material at treating temperature becomes sticky. This causes the material to adhere to the walls of the heating chamber thereby creating maintenance problems. In addition, since all substances in the powdery material do not become sticky at the same temperature, some of such substances may stick to walls leaving a final product that may be of a different composition than desired.

The objects of this invention are to place the gases and material in a counterflow relationship in regard to temperature gradient, to rotate the gases at a high velocity thereby allowing small chambers, and to eliminate the sticking of the material to the walls of the chamber.

The inventor accomplishes these objects by admitting gas through an entrance in the circumference of a circular chamber in such a manner that it will spiral toward the center where it is exhausted, and by injecting fuel at some point intermediate the points of admission and exhaustion of the gas. Thus, the hottest part of the spiraling gas is radially between the fuel injection point of the chamber and the exhaust opening. The material is introduced near the exhaust opening and, because the gas is rotating at a high velocity, is carried along with the spirally rotating gas in a generally circular path. This circular motion imparts centrifugal force to the material thereby causing it to move outwardly in a spiral path (rather than inwardly as the gas moves) toward the circumference of the chamber where it is discharged. The velocity of the gas must be appropriately adjusted and the material must be injected radially outward of the gas exhaust opening at a sufficient distance so that the centrifugal force has sufficient time to develop and overcome the tendency of the material to be carried along with the gas. Thus, the material is preheated as it approaches the fuel injection area, treated at the fuel injection area, and cooled as it moves toward the circumference. The entering gas is, conversely, preheated as it moves from the circumference toward the fuel injection area by the hot material and is cooled before it is exhausted (after passing through the fuel injection area) by the entering cooler material. The gas, material, fuel or secondary gas may be preheated before introduction into the chamber if necessary.

In explaining the motion of the particles within the spiral gas stream it has been stated that the centrifugal force overcomes the frictional force upon the particles and causes them to move outwardly in a spiral path toward the circumference of the chamber. It is then apparent that since the incoming spiral gas is continually being heated by the hot material its temperature increases toward the fuel injection point along its spiral path. This causes gradient temperature levels to exist along the spiral path so that any spiral (one having made a complete circle) is at a different temperature than any spiral adjacent to it. Therefore, the material spiraling outwardly while moving in the same general direction as the gas, moves through these different temperature layers thereby coming in contact with gas at a different and continually changing temperature level. This is, therefore, essentially a counterflow relationship since the movement of the material is counter to the direction of change of temperature of the gas.

Any size of fine material may be treated in the same unit applying this method by providing means for controlling the velocity of the gas stream. The velocity can be controlled by varying the pressure of the gas being introduced, by varying the size of the gas entrance port, by varying back pressure on the exhaust port, by varying the fuel input so as to add or detract from the velocity of the flowing gas, by introducing a secondary processing gas with a controlled direction and velocity at a determined point in the gas stream, or by any combination of these. By controlling the velocity of the gas, it is possible to handle particles of different degrees of fineness and density. For example, a material finer and lighter than another necessitates a proportional increase in the velocity of the circulating gas so that the centrifugal force upon the particles exceeds the frictional force between the material and the gas. Otherwise the material would merely be carried with the spiraling gas through the gas exhaust port. When varying the velocity to insure that this does not occur, care should be taken not to overcompensate so as to cause the material particles to be slung out so quickly that insufficient treatment time of the material results.

Another advantage of this spiraling gas approach to the problem is that the gases may have a high velocity along a relatively long travel path in a comparatively small apparatus. Because the velocity of the gas is high, a large amount of gas may be passed through the chamber in a given amount of time thereby enabling a more efficient operation.

If processing gas is used without the production of heat for treatment, many of the advantages of this method are retained because of the prolonged exposure time and the control of place of introduction of any substances used.

The elimination of the problem arising from particles adhering to the walls of the chamber is accomplished by this method and apparatus because of two factors: First, the material is cooled below the temperature at which it is sticky before it reaches the circumferential (annular) wall; second, the material does not come in contact with the side walls while it is at a temperature where it may be sticky.

The first factor has been explained previously and results from the fact that the material circulating toward the circumference of the chamber passes through the entering gas and is thereby cooled. This cooling is sufficient to lower the temperature of the particles below that temperature at which they might adhere to the circumferential walls.

The second factor can be explained by a study of the velocity flow components parallel to the cylindrical axis of the chamber in relation to the circulating gas. The gas stream rotating within the chamber does not have an equal axial velocity (looking at it another way, the gas stream is composed of many parallel streams flowing at different velocities) because the gas passing nearer the side walls is slowed down by friction with the side walls. This results in an axial velocity gradient in the stream. Pressure is greater in the slower moving streams and since these are next to the side walls, the material is forced toward the progressively higher velocity portion in the center. As a result, a greater proportion of the material is carried by the portion of the stream circulating in the center of the chamber. To visualize this, the spiral stream can be considered as a straight flow path, that is, straightened out within a chamber of relatively long length. In such a situation, a gas flowing at a rather high velocity and carrying powdery material will carry most of the material away from the side walls and in the center. A common example of this effect is observed in a rapidly flowing river when a floating object drifts toward the center (where the water flows faster) and is carried along with the faster current. This results from the slowing of the water along the shore by friction with the banks of the river.

Other objects and advantages will be apparent from the following detailed description of a typical installation and a possible modification of this invention.

FIG. 1 is a view in a vertical plane of an installation for performing this invention;

FIG. 2 is an end view of FIG. 1; and

FIG. 3 is a variation of the invention shown in FIGS. 1 and 2.

The method of the present invention will be described in detail with regard to two embodiments of apparatus that are shown built according to the present invention. According to the present invention, it has been stated, a gas from a suitable source is moved in a stream that is directed along a spiral path inwardly to a location that is central to the spiral path. An apparatus for accomplishing such movement of a gas along the described path as shown in FIGS. 1 and 2 includes a generally cylindrical chamber 1 having an annular wall 1*a* and side walls 2 and 2*a*. Gas moves into the chamber 1 and is directed along the spiral path, indicated in FIG. 1 by a line of dots 21, by admitting the gas to the chamber 1 through a tangentially located inlet port 3. As indicated by the dotted line the gas flows to the center of the chamber 1 and out a gas exhaust port 5 and conduit 5*a*.

Particles of finely divided powdery material to be treated within the chamber 1 are admitted to the chamber by injecting the particles into the gas stream at a point along the path 21 intermediate the inlet port 3 and the gas exhaust port 5. As shown in FIGS. 1 and 2 the material is injected into the chamber 1 by providing a material feed pipe 6 in the exhaust conduit 5*a*. The pipe 6 projects inwardly of gas exhaust port 5 to a location intermediate the side walls 2 and 2*a*. The pipe 6 is provided with a radially directed extension 6*a* that projects toward the annular wall 1*a*. The extension 6*a* of pipe 6 has a material feed port 7 and injects the material to be treated into the gas stream 21 at a point displaced radially outward from the central axis of the pipe 6. The length of the extension 6*a* of material feed pipe 6 is sufficient to inject the material to be treated at a point where motion imparted to the particles along path 21 will result in sufficient centrifugal force to the particles to overcome the tendency of the gas stream to carry the particles along path 21.

The centrifugal force acting upon particles of material injected into chamber 1 through port 7 is caused to overcome the tendency of the gas stream 21 to carry these particles out the discharge port 5. This is caused to occur by controlling the velocity of the gas stream 21 so that the centrifugal force upon the particles of material exceeds the frictional force between the material and the gas. That such has been achieved will be evidenced by the material moving spirally outward along a path as indicated by the line of dots and dashes 22 in FIG. 1. As line 22 indicates, the flow of material is from the port 7 to a peripherally located discharge port 8 on the lower portion of the annular wall 1*a*, at which point the material escapes the influence of gas stream 21 and is slung out the discharge port 8 by a combination of centrifugal and gravitational forces. The adjustment of the velocity of the gas stream 21 to achieve the aforementioned result is of the nature of increasing the velocity of gas stream 21 when very fine material is injected through port 7 and, vice versa, reducing the velocity of gas stream 21 when coarser material is injected through port 7. As shown in FIGS. 1 and 2, the control of the velocity of gas stream 21 is provided for by a throttle valve 4.

The material injected into chamber 1 through port 7 may be heat treated as it follows the path 22, which repeatedly intersects with the path of gases 21, by introducing a fuel reactant into the chamber 1 at a location radially intermediate the gas inlet port 3 and the material feed port 7. As shown on FIGS. 1 and 2, a fuel reactant may be introduced through a tangentially arranged feed pipe 9 that is provided with control means such as a regulating valve 10. When such as a gaseous fuel is admitted to the pipe 9, it can be expected that the fuel will closely follow the path 21 of the gases admitted at port 3. If, on the other hand, solid fuel is injected through the pipe 9 it may follow the path 21 of the gases or the path 22 of the material injected at port 7, depending upon the amount of influence of centrifugal force on the particles of fuel relative to the frictional force from contact with gas admitted at port 3. These two factors will have a varying net effect on the path taken by the solid fuel from pipe 9 just as the same factors affect the path of solid material injected from port 7.

Additional variations in the reactions taking place within chamber 1 may be made by injecting a supplementary gas through an inlet pipe 11 under the control of such as valve 12 in a manner similar to that applied to the pipe 9. The supplementary gas admitted through pipe 11 may be the same gas as admitted through port 3 for such purposes as influencing the velocity and direction of the path taken by the gases admitted through port 3.

Figure 2:
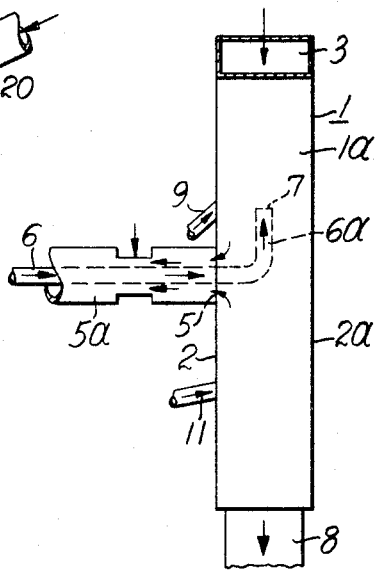
Figure 3:
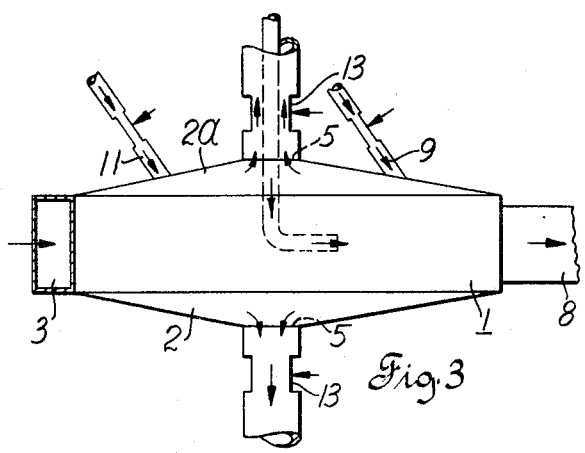

A second embodiment of apparatus, according to the present invention, for carrying out the method of treating powdery material hereinbefore described is disclosed in FIG. 3. FIG. 3 discloses an apparatus in which a chamber 1 and a gas inlet port 3 are arranged to provide for moving gas along a spiral path in a horizontal plane, rather than a spiral path in a vertical plane as shown in FIGS. 1 and 2. The apparatus of FIG. 3 is shown as having conical side walls 2, 2a and an exhaust port 5 centrally located in both of the side walls 2 and 2a. Gas exhaust regulators 13 are provided in exhaust passages 5a leading from the ports 5. Fuel feed and secondary gas feed pipes 9 and 11 are shown projecting through the side walls 2a in the manner and for purposes similar to that shown in FIGS. 1 and 2. In this embodiment the material discharge port 8 is located at the same horizontal level as the gas inlet port 3 but unlike the device of FIGS. 1 and 2, there are two exhaust ports 5 on opposite sides of the chamber 1. The apparatus of FIG. 3 does not operate quite as satisfactorily as the apparatus shown in FIGS. 1 and 2 and, therefore, the latter is preferred. However, in some installations vertical height limitations may make it impractical to use such an arrangement and then an apparatus such as shown in FIG. 3 can be used. The conical side walls as shown in FIG. 3 along with the double exhaust port 5 arrangement of FIG. 3 are features that, of course, may be applied equally well to the apparatus of FIGS. 1 and 2.

An example of the operation of the described apparatus to carry out a useful purpose might be for producing cement clinker. To apply the method and apparatus of the present invention to such a purpose, air is delivered by blower 20 (FIG. 1) to inlet port 3 under the control of throttle valve 4. The air admitted through port 3 is circulated through the chamber 1 along the spiral path indicated by the dotted line numbered 21 and the flow spirals inwardly to centrally located exhaust port 5. Fuel reactant, such as a combustible gas, is injected through inlet 9 at the indicated location intermediate inlet port 3 and outlet port 5. Secondary gas inlet pipe 11 may admit secondary air to insure proper combustion of the fuel admitted by inlet 9. Because of the location of the point where the fuel is injected into the spiraling gas, the hottest temperatures reached in the spiraling gas will be achieved between the fuel injection inlet 9 and the exhaust port 5 and therefore the hottest temperatures will not reach the peripheral walls 1a. Solid particles, which in this example are cement making raw materials, are introduced near the exhaust opening 5 but radially outward therefrom a short distance. Because the air flow along line 21 is at high velocity at the point of injection of the solid particles, such material is carried along with the spirally rotating gas. However, since the circular nature of the air movement imparts centrifugal force to the material, the resultant of the forces acting upon each particle moves the particle along spiral path 22 outward toward the circumference of the chamber 1 where the material is discharged through the discharge port 8. The velocity of the air traveling path 21 may be adjusted in the several ways hereinbefore described to insure movement of the particles along path 22. Lines 21 and 22 show how the particle flow will repeatedly intersect the gas flow thus the material will be preheated as it approaches the fuel injection area, burned (calcined) to form cement clinker in the combustion area, and cooled as the particles (now cement clinker), move toward the circumference and discharge port 8. It can also be seen how the air will be preheated as it cools the particles and approaches the combustion area. After the gas passes inwardly of the combustion area and acts to preheat the solid particles, the gas itself, of course, is cooled.

From the explanation of the operation of the apparatus with regard to producing cement clinker and other operations and structural features previously discussed and explained, it will be apparent to those skilled in this art that the stated objects have been achieved. On the other hand, it will also be obvious to those skilled in the art that the methods and apparatus embodiments described may be varied and modified without necessarily departing from the spirit of the invention or sacrificing all of the advantages thereof. Accordingly, the disclosure herein is illustrative only and the invention is not limited thereto.

Having now particularly described and ascertained the nature of my said invention and the manner in which it is to be performed, I declare that what I claim is:

1. In an apparatus for heat treating powdery material in suspension: walls spaced apart from each other with a generally annular surface between them forming a chamber; tangential means for introducing gas into the chamber; centrally located means for exhausting gas from the chamber; means interposed between the annular surface and the centrally located exhausting means for introducing fuel reactant into the chamber; means in communication with said chamber for introducing the material to be treated into the chamber, said material introducing means being interposed between the exhausting means and a line circumscribed around the exhausting means with a radius equal to the distance between the means for introducing fuel reactant and the exhausting means; and circumferentially located means for discharging material after it has been treated.

2. In an apparatus for heat treating powdery material in suspension: walls spaced apart from each other with a generally annular surface between them forming a chamber; tangential means for introducing gas into the chamber; centrally located means for exhausting gas from the chamber; means interposed between the annular surface and the centrally located exhausting means for introducing fuel reactant into the chamber; means in communication with said chamber for introducing the material to be treated into the chamber, said material introducing means being interposed between the exhausting means and a line circumscribed around the exhausting means with a radius equal to the distance between the means for introducing fuel reactant and the exhausting means; circumferentially located means for discharging material after it has been treated; and regulating means for controlling the velocity of the gas within the chamber.

3. In an apparatus for heat treating powdery material in suspension: walls spaced apart from each other with a generally annular surface between them forming a chamber; tangential means for introducing gas into the chamber; centrally located means for exhausting gas from the chamber; means interposed between the annular surface and the centrally located exhausting means for introducing fuel reactant into the chamber; means in communication with said chamber for introducing the material to be treated into the chamber, said material introducing means being interposed between the exhausting means and a line circumscribed around the exhausting means with a radius equal to the distance between the means for introducing fuel reactant and the exhausting means; circumferentially located means for discharging material after it has been treated; and regulating means for controlling the direction and velocity of introducing fuel reactant.

4. In an apparatus for heat treating powdery material in suspension: walls spaced apart from each other with a generally annular surface between them forming a chamber; tangential means for introducing gas into the chamber; centrally located means for exhausting gas from the chamber; means interposed between the annular surface and the centrally located exhausting means for introducing fuel reactant into the chamber; means in communication with said chamber for introducing the material to be treated into the chamber, said material introducing means being interposed between the exhausting means and a line circumscribed around the exhausting means with a radius equal to the distance between the means for introducing fuel reactant and the exhausting means; circumferentially located means for discharging material after it has been treated; means for interjecting a secondary gas into the chamber; and regulating means for controlling the direction and velocity of interjecting the secondary gas.

5. A method of treating powdery material in suspension, comprising the steps of:
   first, moving gas from a source thereof in a stream directed inwardly along a spiral path to a location central of the spiral path;
   second, injecting the powdery material to be treated into the gas stream at a point intermediate said source and said location thereby suspending the powdery material in the gas;
   third, controlling the velocity of the gas stream so that the centrifugal force upon said powdery material exceeds the frictional force between the material and the gas as evidenced by the material moving spirally outward from the injecting point to a point of escape from said stream; and
   fourth, introducing fuel reactant into said gas stream at a point intermediate the gas source and the material injection point.

6. A method of treating powdery material in suspension, comprising the steps of:
   first, moving a carrier gas from a source thereof in a stream directed inwardly along a spiral path to a location central of the spiral path;
   second, injecting particles of powdery material to be treated into the carrier gas stream at a point intermediate said source and said location thereby suspending the powdery material in the gas;
   third, controlling the velocity of the carrier gas stream so that the centrifugal force upon said powdery material exceeds the frictional force between the material and the gas as evidenced by the material moving spirally outward from the injecting point to a point of escape from said stream;
   fourth, introducing a processing gas into the carrier gas stream at a point intermediate said source of the carrier gas and said central location, and mixing said processing gas to react with the powdery material; and
   fifth, interjecting a supplementary gas into the carrier gas stream at a point intermediate said source of the carrier gas and said central location and controlling its direction and velocity to supplement the effects of the third step.

7. A method of treating powdery material in suspension, comprising the steps of:
   first, moving gas from a source thereof in a stream directed inwardly along a spiral path to a location central of the spiral path;
   second, injecting the powdery material to be treated into the gas stream at a point intermediate said source and said location thereby suspending the powdery material in the gas;
   third, controlling the velocity of the gas stream so that the centrifugal force upon said powdery material exceeds the frictional force between the material and the gas as evidenced by the material moving spirally outward from the injecting point to a point of escape from said stream;
   fourth, introducing fuel reactant into said gas stream at a point intermediate the gas source and the material injection point; and
   fifth, controlling the velocity and direction of introducing said fuel reactant to supplement the effects of the third step.

8. A method of treating powdery material in suspension, comprising the steps of:
   first, moving a carrier gas from a source thereof in a stream directed inwardly along a spiral path to a location central of the spiral path;
   second, injecting the powdery material to be treated into the carrier gas stream at a point intermediate said source and said location thereby suspending the powdery material in the gas;
   third, controlling the velocity of the carrier gas stream so that the centrifugal force upon said powdery material exceeds the frictional force between the material and the gas as evidenced by the material moving spirally outward from the injecting point to a point of escape from said stream;
   fourth, introducing fuel reactant into said gas stream at at point intermediate the gas source and the material injection point;
   fifth, controlling the velocity and direction of introducing said fuel reactant to supplement the effects of the third step; and
   sixth, interjecting a supplementary gas into the carrier gas stream at a point intermediate said source of the carrier gas and said central location and controlling its direction and velocity to supplement the effects of the third step.

References Cited in the file of this patent

UNITED STATES PATENTS

| | | |
|---|---|---|
| 2,032,827 | Andrews | Mar. 3, 1936 |
| 2,357,303 | Kerr et al. | Sept. 5, 1944 |
| 2,441,613 | Balassa | May 18, 1948 |
| 2,635,564 | Havemann | Apr. 21, 1953 |
| 2,808,012 | Schindler | Oct. 1, 1957 |
| 2,856,268 | Young | Oct. 14, 1958 |
| 2,905,116 | Sifrin et al. | Sept. 22, 1959 |